United States Patent [19]

Moser

[11] 3,708,700

[45] Jan. 2, 1973

[54] AMPLIFIER CIRCUIT

[75] Inventor: Helmut Moser, Heilbronn-Neckargartach, Germany

[73] Assignee: Licentia, Patent-Verwaltungs-G.m.b.H., Frankfurt am Main, Germany

[22] Filed: Jan. 28, 1971

[21] Appl. No.: 110,550

[30] Foreign Application Priority Data

Jan. 31, 1970 Germany....................P 20 04 462.6

[52] U.S. Cl. ...................307/309, 307/235, 307/310, 330/6, 330/23, 330/24

[51] Int. Cl. ................................................H01v 5/00

[58] Field of Search..........330/6, 23, 24, 38 R, 38 M; 307/309, 310

[56] References Cited

UNITED STATES PATENTS 3,392,342 7/1968 Ordower........................330/38 M X
3,531,655 9/1970 Taylor.............................307/310 X
3,264,571 8/1966 Meindl et al. ..........................330/23

FOREIGN PATENTS OR APPLICATIONS 44,826 6/1961 Poland ................................307/310

OTHER PUBLICATIONS

Yaap et al., "Logical Device," IBM Technical Disclosure Bulletin, Vol. 2, No. 5, February, 1960, pp. 59, 60

*Primary Examiner*—Roy Lake
*Assistant Examiner*—James B. Mullins
*Attorney*—Spencer & Kaye

[57] ABSTRACT

An amplifier circuit comprises a common-emitter connected transistor into the collector path of which is connected a first resistance also connected to a voltage source and a voltage divider for adjusting the base emitter direct voltage and including a series connection of a second resistance and a diode, the second resistance being connected to the voltage source and the diode being connected in parallel with the base-to-emitter path of the transistor.

9 Claims, 2 Drawing Figures

Inventor:
Helmut Moser
BY Spencer & Kaye
ATTORNEYS

AMPLIFIER CIRCUIT

BACKGROUND OF THE INVENTION

The invention relates to an amplifier consisting of at least one transistor with a common-emitter connection, into the collector path of which there is connected a resistor which is connected to the source of supply voltage and of which the base-to-emitter direct voltage is adjusted by means of a voltage divider.

SUMMARY OF THE INVENTION

The object of the present invention is to provide a threshold amplifier or a contactless switch which can be simple in construction and can be independent on temperature.

According to the invention, there is provided an amplifier circuit comprising a common-emitter connected transistor, a first resistance connected into the collector path of said transistor and connected to a source of supply voltage, and a voltage divider for adjusting the base-emitter direct voltage of said transistor and including a second resistance connected to said source of supply voltage, and a diode connected in series with said second resistor and in parallel with the base-emitter path of said transistor.

BRIEF DESCRIPTION OF THE DRAWINGS

The invention will now be described in greater detail, by way of example, with reference to the accompanying drawings, in which.

DESCRIPTION OF THE PREFERRED EMBODIMENTS

Basically, in accordance with the invention, in an amplifier comprising at least one transistor with a common emitter connection, into the collector path of which there is connected a resistor which is connected to the source of supply voltage and of which the base-to-emitter direct voltage is adjusted by means of a voltage divider, it is proposed that the voltage divider should consist of a series connection of a resistor and a diode, the diode being connected in the same sense as and in parallel with the base-to-emitter diode of the transistor, while the resistor is connected to the source of supply voltage, that the two resistors should be so dimensioned that the current through the voltage divider corresponds substantially to the collector current of the transistor, and that the resistance values of the resistors and should be variable in the opposite sense to one another, by means of external influence.

Magnetic diodes, PTC resistors and thermistors may be considered as resistors which can be varied by external influence. If the two resistors consist of magnetic diodes for example, then these are spatially arranged so that, on a variation in the magnetic field acting on the diodes, the ohmic resistance of the one diode decreases while that of the other diode increases.

Known threshold amplifiers consist mainly of bridge-voltage or bridge-current amplifiers. The new circuit arrangement is based on the principle of the bridge circuit, with the advantage that opposite variations in resistance produce a higher output voltage. In addition, following circuit elements can be coupled up to the amplifier circuit according to the invention with little expense. Variations in resistance in the same sense, which are caused for example by a variation in the temperature conditions, are compensated in the circuit according to the invention and do not lead to a variation in the output voltage.

Figure 1:
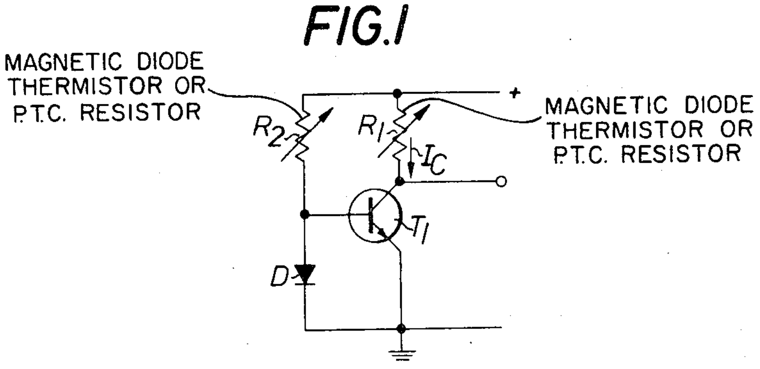
FIG. 1 is a circuit diagram of a simple form of amplifier in accordance with the invention.

Referring now to the drawings, FIG. 1 shows the simplest form of the amplifier according to the invention. A resistor $R_1$, which is connected to the source of supply voltage, is connected into the collector space of a transistor $T_1$ operated in a common-emitter connection. The transistor illustrated in FIG. 1 may be an n-p-n transistor for example, the emitter electrode of which is connected to earth. In the circuit illustrated, the base potential is adjusted by means of a voltage divider consisting of a resistor $R_2$, which is connected to the positive pole of the source of supply voltage, and of a diode D. The diode is operated in the forward direction and is connected in parallel with the base-emitter diode of the transistor $T_1$. The known diode equation:

$$U_D = U_T \ln (I/I_s + 1) \quad (1)$$

applies for the diode forward current. This diode voltage also appears at the base-emitter diode of the transistor $T_1$, for which the corresponding equation applies:

$$U_{BE} = U_T \ln (I_c/\alpha \cdot I_s + 1) \quad (2)$$

This means that with like characteristics of the diode D and the base emitter diode of the transistor $T_1$, the diode current is as great as the collector $I_c$.

$$I = I_c \quad (3)$$

then applies; $U_T$ is a so-called temperature voltage, $I_s$ the reverse current of the diode and $\alpha$ the current amplification.

Said characteristic relationships are valid when the transistor is not operated in the overdriving range. The resistors $R_1$ and $R_2$ are preferably selected equal in size, or $R_2$ is selected smaller than $R_1$ in order to obtain as great a variation as possible in the output voltage on a variation in the resistance values in opposite senses.

If the resistors $R_1$ and $R_2$ are magnetic diodes for example, and the resistance of $R_2$ decreases under the influence of an external field, the diode voltage becomes somewhat greater. The consequence of this is that the base-to-emitter voltage increases at the transistor $T_1$ and the collector-to-emitter voltage becomes smaller at the output of the transistor. At the same time, the resistance $R_1$ becomes greater under the influence of the external field. The load line in the characteristic field therefore becomes flatter and the collector-to-emitter voltage still lower. It will be seen, therefore, that the variations in the resistance values are added in their effect on the output voltage. A variation in $R_1$ and the opposite variation in $R_2$ therefore cause a voltage variation at the collector-to-emitter path of the transistor or at the resistor $R_1$, which is greater than with a corresponding bridge circuit, if the same variations in resistance occur there.

On the other hand, a variation in the resistance values in the same sense, which is caused for example by a variation in the temperature conditions, does not cause any variation in the output voltage.

Figure 2:
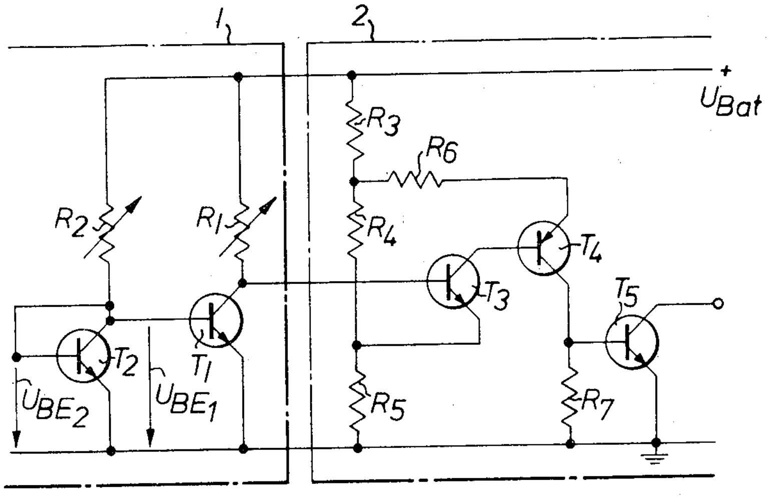
FIG. 2 is a circuit diagram of an amplifier in accordance with the invention connected to a threshold switch.

It has already been indicated that the characteristics of the diode D must correspond as far as possible to those of the base-emitter diode of the transistor. This is particularly the case when the diode is replaced by a transistor $T_2$ which is operated as a diode, as shown in FIG. 2. For this purpose, the collector electrode of the transistor $T_2$ is short-circuited by the base electrode. If the two transistors of the amplifier are realized by the integrated circuit technique in a semiconductor solid, there is certainty that the electrical characteristics of the two transistors will coincide.

Connected to the amplifier circuit 1 is a threshold switch 2 for example, which varies its switching state when a specific potential is reached at the collector electrode of the transistor $T_1$. This threshold amplifier is formed by a Schmitt trigger for example, as is illustrated in FIG. 2. The Schmitt trigger is composed of the two complementary transistor $T_3$ and $T_4$ for example, which are electrically coupled to one another. The emitter resistor $R_5$ of the transistor $T_3$ is, at the same time, part of a voltage divider consisting of the resistors $R_3$, $R_4$ and $R_5$. The connection between the resistors $R_3$ and $R_4$ is connected, through the resistor $R_6$, to the emitter of the transistor $T_4$, the collector electrode of which is connected to earth through the collector resistor $R_7$. The output transistor $T_5$ serves for the further current amplification.

The dependence of the base-emitter voltage of the transistor $T_3$ on temperature is compensated almost entirely by the effect of temperature on the base-emitter voltages of the transistors $T_1$ and $T_2$.

It will be understood that the above description of the present invention is susceptible to various modifications, changes and adaptations.

What is claimed is:

1. An amplifier circuit responsive to an external condition comprising a common-emitter connected transistor, a first resistance connected in the collector path of said transistor and to a source of supply voltage, and a voltage divider for adjusting the base-emitter direct voltage of said transistor, said voltage divider including a second resistance connected to said source of supply voltage and a diode connected in series with said second resistance, said diode being in parallel with the base-emitter path of said transistor, and said first resistance and said second resistance being oppositely variable in ohmic value in response to change in the external condition.

2. A circuit as defined in claim 1, wherein said first and second resistances are respective variable resistors whose resistance values vary oppositely with respect to one another in response to changes in the external condition and whose resistance values cause the current flowing through said voltage divider and said collector path of said transistor to be substantially equal in the absence of change in the external condition from a given value.

3. A circuit as defined in claim 2, wherein said first and second resistors comprise respective magnetic diodes whose ohmic resistance values vary oppositely with respect to one another in response to variation of a magnetic field acting on said magnetic diodes, the magnetic field being the external condition.

4. A circuit as defined in claim 2, wherein said diode comprises the base-emitter path of a further transistor which has its collector electrode shorted to its base electrode.

5. A circuit as defined in claim 2, wherein the collector resistance of said transistor is less than or equal to the resistance value of said second resistance under the influence of the external condition of a given value.

6. A circuit as defined in claim 2, further comprising a threshold switch connected to said transistor and operating to change its switching state when a specific potential is reached at the collector electrode of said transistor.

7. A circuit as defined in claim 6, wherein said threshold switch comprises a Schmitt trigger.

8. A circuit as defined in claim 2, wherein said first and second resistors comprise thermistors.

9. A circuit as defined in claim 2, wherein said first and second resistors comprise P.T.C. resistors.

* * * * *